July 11, 1944.　　　　　J. J. SEME　　　　　2,353,371
CHUCK
Filed Nov. 30, 1942

INVENTOR.
JOHN J. SEME
BY
Frank N. Harmon
ATTORNEY

Patented July 11, 1944

2,353,371

UNITED STATES PATENT OFFICE 2,353,371

CHUCK

John J. Seme, Maple Heights, Ohio, assignor to Jack & Heintz, Inc., Bedford, Ohio, a corporation of Ohio Application November 30, 1942, Serial No. 467,337

5 Claims. (Cl. 279—64)

This invention relates in general to improvements in chucks and has for its primary object to provide a chuck, the jaws of which upon engagement with the work will be free of any tendency to bind and which will apply uniform centering pressure on the work to insure its proper centering and alignment with respect to the chuck.

With the foregoing and other objects in view, the invention resides in the combination of parts and in the details of construction hereinafter set forth in the following specification, certain embodiments of which are illustrated in the accompanying drawing, in which.

Figure 1:
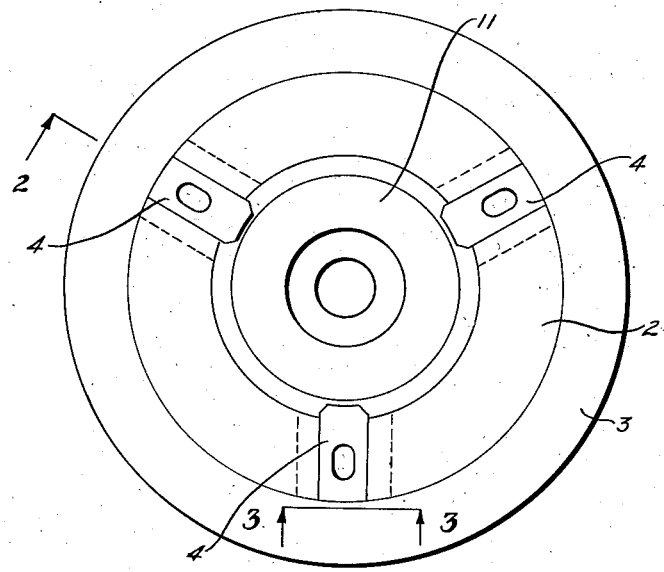
Figure 1 is a view in end elevation of the chuck head showing the concentrically arranged jaws.
Figure 2:
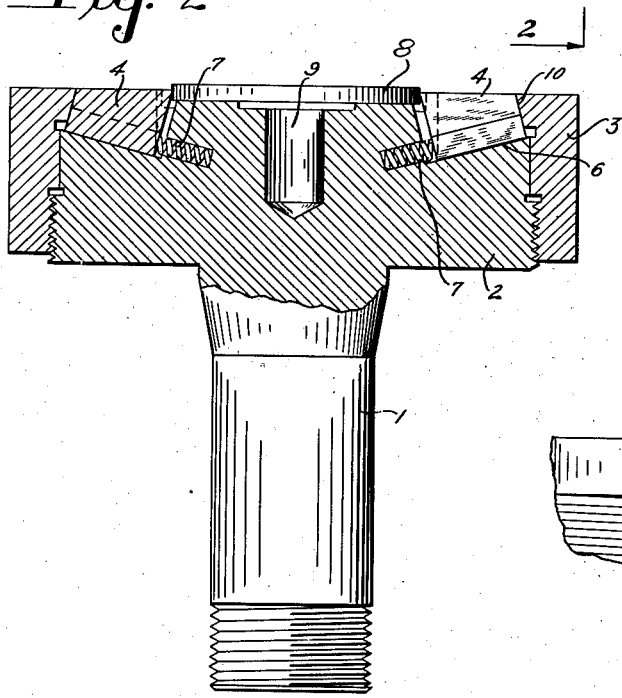
Figure 2 is a view in section, taken along line 2—2 of Figure 1 through the chuck showing the work being engaged by the jaws.
Figure 3:
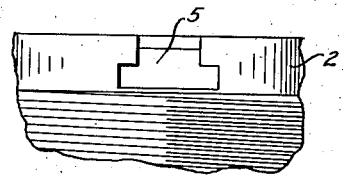
Figure 3 is a view in section taken along line 3—3 of Figure 1, with the jaw removed, showing the groove in the chuck head for guiding the sliding jaw.

Referring more particularly to the drawing, the chuck is shown as having a shank 1 and a circular head 2 provided with screw threads to receive a clamping ring 3. The head is counterbored to receive three work gripping jaws 4 each of which is maintained within a guide 5 cut in the head so as to be slidable concentrically toward the center of the head along the inclined surface 6 against the action of a compression spring 7.

With the work 8 placed over the center bore 9 and the three jaws 4 resting loosely in place and out of engagement with the work, the ring 3 is screwed onto the head. The inner bevelled surface 10 of the ring 3 corresponds to the outer bevelled surface of each jaw.

Thus as the ring 3 is screwed home on the head each jaw is forced inwardly down the incline 6. Inasmuch as each jaw is equally spring loaded by the compression spring 7 the jaws uniformly engage and grip the work and properly center and align it so that it is flush with the upper face 11 of the head and perpendicular to the axis of the center bore 9.

I claim:

1. In a device of the character described, a chuck head provided with a plurality of concentrically and equidistantly arranged inverted T-slot guides in said head with bottom surfaces inclined downwardly toward the center of said chuck head, a work gripping jaw slidably arranged in each guide, a detachable ring with both ends open and adapted for screw-threaded engagement with said head and having its inner upper surface adjacent the work support of said chuck head bevelled to incline radially inwardly and adapted to force said jaws radially inwardly into equal gripping relationship with the work as the top surfaces of the jaws and the ring remain substantially flush with each other, and equal resilient means for opposing the movement of each jaw, said guides positively engaging said jaws so as to prevent movement thereof in any direction other than the plane of the bottom surfaces of each guide, whereby said work is uniformly gripped by each jaw and centered with respect to the center of said head.

2. In a device of the character described, a chuck head provided with a plurality of concentrically and equidistantly arranged inverted T-slot guides therein and a work gripping jaw slidably arranged in each guide and positively confined thereby to linear movement toward and away from the center of said chuck head, a detachable ring with both ends open and adapted for screw-threaded engagement with said head and having its inner upper surface adjacent the work support of said chuck head bevelled radially inwardly and adapted to engage a correspondingly bevelled adjacent surface of said jaw to force said jaws equally downwardly and radially inwardly and into equal gripping relationship with the work as the top surfaces of the jaws and the ring remain substantially flush with each other, and equal resilient means for opposing the movement of each jaw, whereby said work is uniformly gripped by each jaw and centered with respect to the center of said head.

3. In a device of the character described, a chuck head provided with a plurality of concentrically and equidistantly arranged inverted T-slot guides therein and a work gripping jaw slidably arranged in each guide, and positively confined thereby to linear movement toward and away from the center of said chuck head, said guides having their bottom surfaces equally inclined downwardly and radially inwardly toward the center of said head, a detachable ring with both ends open and adapted for screw-threaded engagement with said head and having its upper inner surface bevelled radially inwardly and adapted to engage a correspondingly bevelled adjacent surface of said jaw to force said jaws equally downwardly and radially inwardly and into equal gripping relationship with the work as the top surfaces of the jaws and the ring remain substantially flush with each other, and equal resilient means for opposing the movement of each jaw, whereby said work is uniformly gripped by each jaw and centered with respect to the center of said head.

4. In a device of the character described, a chuck head provided with a plurality of concentrically and equidistantly arranged inverted T-slot guides therein and a work gripping jaw slidably arranged in each guide and positively confined thereby to linear movement toward and away from the center of said chuck head, said guides having their bottom surfaces equally inclined downwardly and radially inwardly toward the center of said head, a detachable ring with both ends open and adapted for screw-threaded engagement with said head to force said jaws radially inwardly into gripping relationship with the work as the top surfaces of the jaws and the ring remain substantially flush with each other, and resilient means for opposing the movement of each jaw, whereby said work is uniformly gripped by each jaw and centered with respect to the center of said head.

5. In a device of the character described, a chuck head provided with a plurality of concentrically and equidistantly arranged inverted T-slot guides therein and a work gripping jaw slidably arranged in each guide and positively confined thereby to linear movement toward and away from the center of said chuck head, said guides having their bottom surfaces equally inclined downwardly and radially inwardly toward the center of said head, a detachable ring with both ends open and adapted for screw-threaded engagement with said head and having its upper inner surface inclined upwardly and radially inwardly to engage a correspondingly bevelled adjacent surface of said jaw to force said jaws equally downwardly and radially inwardly and into equal gripping relationship with the work as the top surfaces of the jaws and the ring remain substantially flush with each other and equal resilient means for opposing the movement of each jaw, whereby said work is uniformly gripped by each jaw and centered with respect to the center of said head.

JOHN J. SEME.